US00RE46149E

(19) United States
(12) Reissued Patent
Gruss et al.

(10) Patent Number: US RE46,149 E
(45) Date of Reissued Patent: Sep. 20, 2016

(54) SUNROOF UTILIZING TWO INDEPENDENT MOTORS

(71) Applicant: Tesla Motors, Inc., Palo Alto, CA (US)

(72) Inventors: Matthew P. Gruss, San Francisco, CA (US); Marcus Christensen, Davisburg, MI (US); Peter D. Rawlinson, Evesham (GB); Vinay Kaley, Sunnyvale, CA (US); Mitchell Stephens, Lexington, KY (US)

(73) Assignee: TESLA MOTORS, INC., Palo Alto, CA (US)

(21) Appl. No.: 14/698,455

(22) Filed: Apr. 28, 2015

Related U.S. Patent Documents

Reissue of:
(64) Patent No.: 8,708,404
Issued: Apr. 29, 2014
Appl. No.: 13/629,348
Filed: Sep. 27, 2012

U.S. Applications:
(60) Provisional application No. 61/540,930, filed on Sep. 29, 2011.

(51) Int. Cl.
*B60J 7/057* (2006.01)
*B60J 7/043* (2006.01)

(52) U.S. Cl.
CPC ..... *B60J 7/043* (2013.01); *B60J 7/0435* (2013.01)

(58) Field of Classification Search
CPC ..... B60J 7/043; B60J 7/0435
USPC ..... 296/223, 216.08
See application file for complete search history.

(56) References Cited

U.S. PATENT DOCUMENTS

| | | | | |
|---|---|---|---|---|
| 2,985,483 | A * | 5/1961 | Bishop et al. | B60J 7/0573 160/188 |
| 6,345,860 | B1 * | 2/2002 | Adam et al. | B60J 7/0573 296/220.01 |
| 6,783,174 | B2 * | 8/2004 | Bohm | B60J 7/0573 296/223 |
| 8,282,157 | B2 * | 10/2012 | Kato et al. | E05F 15/41 296/214 |
| 2010/0308627 | A1 * | 12/2010 | Horiuchi | B60J 7/0038 296/223 |

* cited by examiner

*Primary Examiner* — William Doerrler
(74) *Attorney, Agent, or Firm* — Garlick & Markison; Bruce E. Garlick

(57) ABSTRACT

Continuous cross sectional profile guide tracks in an outer sliding sunroof/moonroof are provided where both the front and rear mechanism or mechanism links travel fore/aft in the same channels as each other and have fore/aft travel that is limited only by vehicle architecture. The guide track channel is partly or entirely outside/outboard of the primary water/wind sealing system of the sunroof.

7 Claims, 6 Drawing Sheets

SUNROOF UTILIZING TWO INDEPENDENT MOTORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This Application claims the benefit of U.S. Provisional Application 61/540,930 filed on Sep. 29, 2011 the contents of which is expressly incorporated by reference thereto in its entirety for all purposes.

This application is related to U.S. application Ser. No. 13/628,980 that claims benefit of U.S. Provisional Application 61/540,557 filed on Sep. 29, 2011, U.S. application Ser. No. 13/629,169 that claims benefit of U.S. Provisional Application 61/540,648 filed on Sep. 29, 2011, U.S. application Ser. No. 13/629,238 that claims benefit of U.S. Provisional Application 61/540,758 filed on Sep. 29, 2011, and U.S. application Ser. No. 13/629,392 that claims benefit of U.S. Provisional Application 61/541,021 filed on Sep. 29, 2011, the contents of which are all expressly incorporated by reference thereto in their entireties for all purposes.

FIELD OF THE INVENTION

The present invention relates generally to passenger compartments, and more specifically, but not exclusively, to a moveable roof track assembly of a passenger vehicle.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Outer sliding panels (also commonly referred to as sunroofs, moonroofs, panorama roofs, panoramic roofs and other trade names herein referred to generically as a sunroof) are sunroofs where a movable panel (made of glass, sheet metal, metal reinforcements, polycarbonate or a combination of these or similar materials), from its closed position, lifts or tilts and then moves into a position above a fixed panel where it effectively provides an opening in the roof to the outside air. This can give occupants the feel of openness towards the sky similar to a retracted convertible top. The larger the open air opening ("hands through opening") and the larger the transparent opening when the moving panel is closed ("day light opening") the more value is gained regarding this feeling.

Typical outer sliding sunroof designs use a kinematic system mounted at a roof line to control opening and closing of the sunroof. The kinematic system often includes a mechanical assembly driven by a motor. Placement of the kinematic system at the roof line (which is close to the head of a vehicle operator and passengers) reduces a volume of the passenger compartment while increasing the interior noise level to the operator and passengers. To reduce these effects, additional soundproofing is used, which further limits the volume and a torque capability of the motor is constrained because increases in torque capability increase size and noise. The increasing size, and soundproofing to counter noise both further reduce the volume.

What is needed is a system and method for improving sunroof implementations to increase hands through opening and day light opening characteristics while reducing constraints of the kinematic system on these characteristics.

BRIEF SUMMARY OF THE INVENTION

Disclosed is a system and method for improving sunroof implementations to increase "hands through opening" and "day light opening" characteristics while reducing constraints of the kinematic system on these characteristics.

The following summary of the invention is provided to facilitate an understanding of some of technical features related to sunroof implementations, and is not intended to be a full description of the present invention. A full appreciation of the various aspects of the invention can be gained by taking the entire specification, claims, drawings, and abstract as a whole. The present invention is applicable to other passenger compartments.

A moveable panel system for a roof of a passenger compartment of a vehicle, comprising: a roof wall of the vehicle having roof line, a left lateral edge, a right lateral edge, a front edge, and a rear edge with said roof wall defining a passenger compartment opening between said edges; a pair of tracks disposed in said roof wall and longitudinally extending from said front edge towards said rear edge including a left track extending along said left lateral edge and a right track extending along said right lateral edge; a panel sized to close said opening; a set of mechanical linkages disposed in said tracks and moveably coupling said panel to said tracks, said set of mechanical linkages including a left mechanical linkage coupled to a left side of said panel and a right mechanical linkage coupled to a right side of said panel; a left mechanical interface coupled to said left mechanical linkage having an open mode that moves said left side towards said rear edge and said left mechanical interface having a close mode that moves said left side towards said front edge; a right mechanical interface, independent from said left mechanical interface, coupled to said right mechanical linkage having an open mode that moves said right side towards said rear edge and said right mechanical interface having a close mode that moves said right side towards said front edge; a pair of motors mounted to the vehicle below said roof line and responsive to a plurality of motor control signals, said pair of motors including a left motor coupled to said left mechanical interface and controlling said modes of said left mechanical interface and including a right motor coupled to said right mechanical interface and controlling said modes of said right mechanical interface; and a motor controller coupled to said motors and generating said plurality of motor control signals including an open control signal and a closed control signal with said open control signal causing said motors to operate their coupled mechanical interfaces in said open mode and with said close control signal causing said motors to operate their coupled mechanical interfaces in said close mode.

The embodiments of the present invention described herein provides a continuous cross sectional profile guide tracks in an outer sliding sunroof where both the front and rear mechanism or mechanism links travel fore/aft in the same channels as each other and have fore/aft travel that is limited only by the vehicle architecture. This guide track channel is partly or entirely outside/outboard of the primary water/wind sealing system of the sunroof. The movement of the panel coupled to the mechanisms is driven by two independent motors installed below a roof line, which further increases the potential opening size, enlarges the headroom of the passenger compartment, and reduces noise for the passengers.

A system for operating a moveable panel with respect to an opening in a roof of a passenger vehicle and responsive to a motor controller generating a plurality of motor control signals, including; a panel guide assembly coupled to the roof along a roof line of the roof, the panel guide assembly including a pair of track at lateral edges of the roof; a set of mechanical linkages moveably coupling the moveable panel to the tracks, the set of mechanical linkages including a first mechanical linkage coupled to a first side of the moveable panel and a second mechanical linkage coupled to a second side of the moveable panel; a pair of mechanical interfaces coupled to the linkages, a first mechanical interface moving the first mechanical linkage and a second mechanical interface moving the second mechanical linkage; and a pair of motors mounted to the passenger vehicle below the roof line and responsive to the plurality of motor control signals, the pair of motors including a first motor coupled to the first mechanical interface and including a second motor coupled to the second mechanical interface.

A method for operating a sunroof of a passenger vehicle, the sunroof moveably coupled to a pair of lateral tracks disposed in a roof of the passenger vehicle, comprising: operating a first mechanical interface coupled to a first lateral edge of the sunroof using a first remote motor disposed below a roofline of the sunroof; and operating a second mechanical interface, concurrently with operation of the first mechanical interface, coupled to a second lateral edge of the sunroof using a second remote motor disposed below a roofline of the sunroof; wherein operation of the mechanical interfaces opens and closes the sunroof.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The present invention eliminates environment seal limitations on hands through and day light opening dimensions while simplifies guide track complexity, assembly requirements, and cost. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method improving sunroof implementations to increase hands through opening and day light opening characteristics while reducing constraints of the kinematic system on these characteristics. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
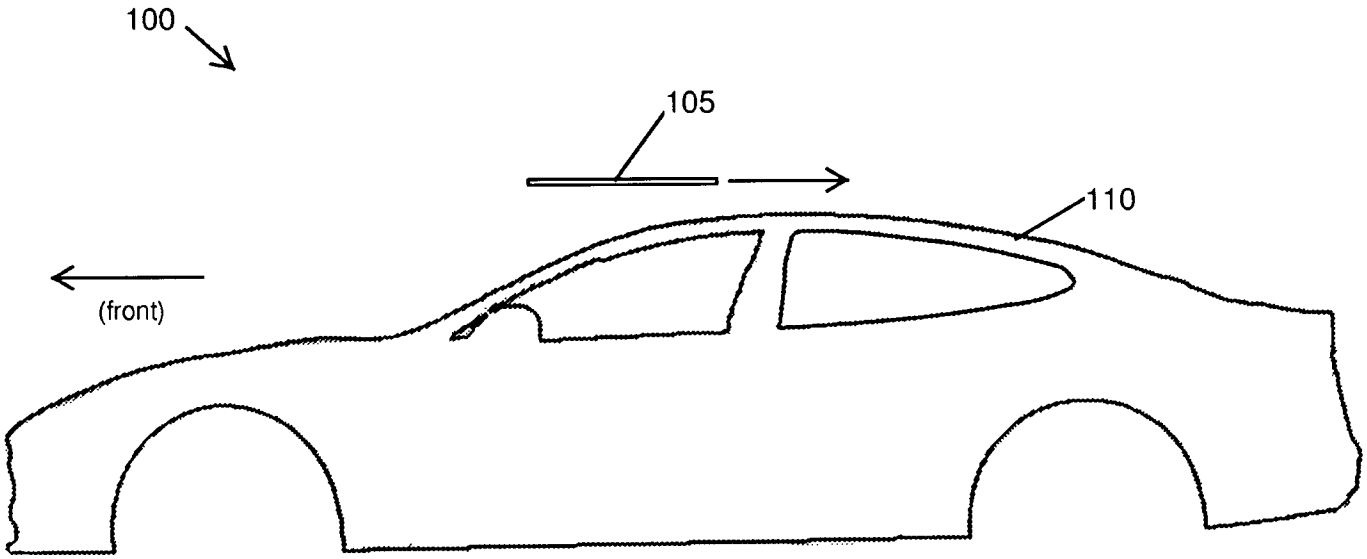
FIG. 1 illustrates a side profile of a vehicle passenger compartment outfitted with in-line outer sliding panorama sunroof tracks.

FIG. 1 illustrates a side profile of a vehicle passenger compartment 100 outfitted with a set of in-line outer sliding panorama sunroof tracks. A sunroof 105 installed in a roof portion 110 of compartment 100 moves fore and aft along the set of tracks. Sunroof 105 is shown schematically above roof portion 110 for ease in visualization but it is understood that it is moveably installed in roof portion 110 as shown and described elsewhere herein.

Figure 2:
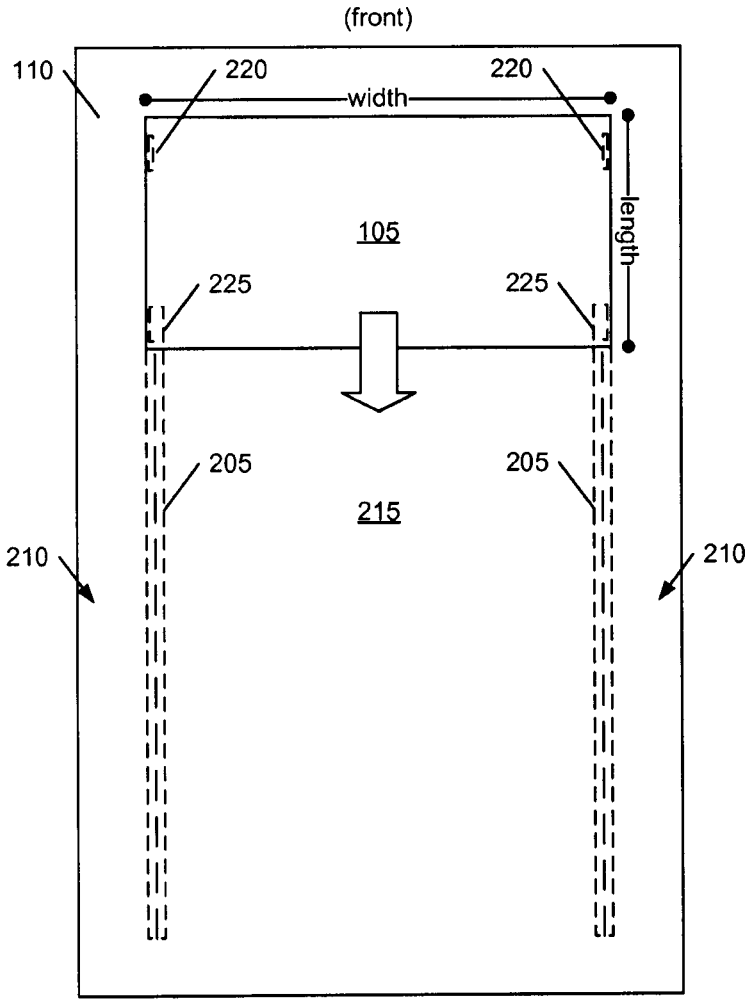
FIG. 2 illustrates a generic representation of a top view of the roof portion of the compartment illustrated in FIG. 1 with the sunroof in the closed mode.

FIG. 2 illustrates a generic schematic representation of a top view of roof portion 110 of compartment 100 illustrated in FIG. 1 with sunroof 105 in a closed mode. A sunroof track 205 is installed at lateral edges 210 of roof portion 110. Sunroof 105 is located above a forward seating area of compartment 100 and moves rearwardly over a region 215 of roof portion 110 when opened. Sunroof 105 provides an aerodynamic profile when closed, and therefore a rear edge of sunroof 105 is in-line with a front edge of region 215. To move rearwardly, sunroof 105 is required to rise up and out of this position when initiating the rearward opening motion to pass over region 215. Further, sunroof 105 drops down and into this position when finishing its closing action. Region 215 may be provided with a fixed moonroof or a solid panel over a rear seating or cargo compartment.

Track 205 is manufactured as a single continuous guiding assembly, such as for example, by an extrusion (e.g., metallic or plastic) process, a roll formation process, a machining process, or the like. Track 205 may be of any length and is installed as a parallel mirror complement to track 205 on an opposing lateral edge 210. The length of track 205 controls how far sunroof 105 may move (i.e., a fore/aft travel distance), which in turn influences a maximum length of sunroof 105. Sunroof 105 may be made longer the further that track 205 runs along lateral edge 210.

Each track 205 includes two parallel guide channels that run its entire length. Sunroof 105 is moveably coupled to these channels using linkage mechanisms that ride in these channels. Sunroof 105 includes a pair of forward linkages 220 (one for each track 205) and a pair of rearward linkages 225 (one for each track 205). In the preferred embodiment, forward linkage 220 and rearward linkage 225 for the same track 205 are disposed in the same physical channel, for example an outermost channel. Additionally, rearward linkage 225 is also disposed in an innermost channel. This enables rearward linkage 225 to independently interact with a lifting/lowering assembly (e.g., a cam or other structure) to lift the rearward edge of sunroof 105 when opening and to lower the rearward edge when closing.

The length of track 205 is affected by an architecture of compartment 100. In conventional systems, a sealing system for sunroof 105 limits the width/length as well as the fore/aft travel distance. In this implementation, the fore/aft travel distance of sunroof 105 is not limited by the sealing system (described later) but rather only limited by architectural demands (for example, a length of roof, a desired head room for the rear seat row(s), an inclusion of a hatchback frame, and a requirement to not continue the travel motion over the backlights or rear window, and the like).

Consequently sunroof 105 is able to achieve significantly larger hands through opening and day light opening sizes than one built with typical construction. Further, these embodiments greatly simplify assembly and manufacturability while allowing reductions in cost because fewer parts are required.

Figure 3:
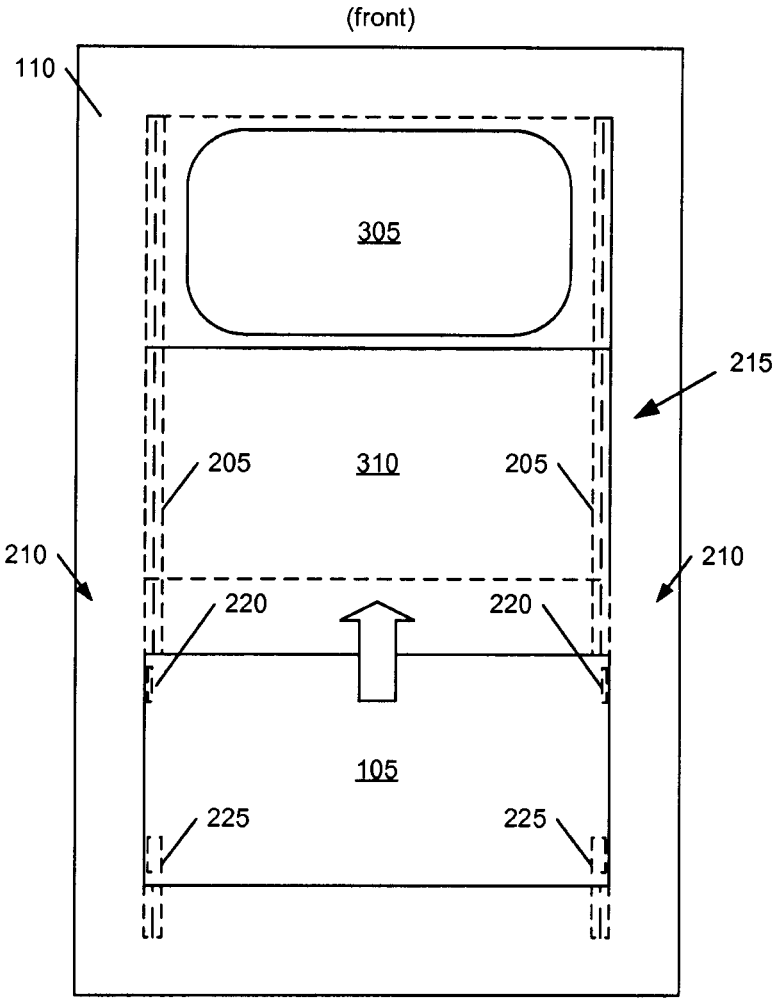
FIG. 3 illustrates the generic representation of FIG. 2 with the sunroof in the open mode.

FIG. 3 illustrates the generic representation of FIG. 2 with sunroof 105 in the open mode. When opened, sunroof 105 reveals a compartment opening 305 that had been previously covered and sealed against the environment. When track 205 is long enough, sunroof 105 may be moved far enough back to uncover enough of region 215 that an optional moonroof 310 in region 215 may be uncovered as well.

Figure 4:
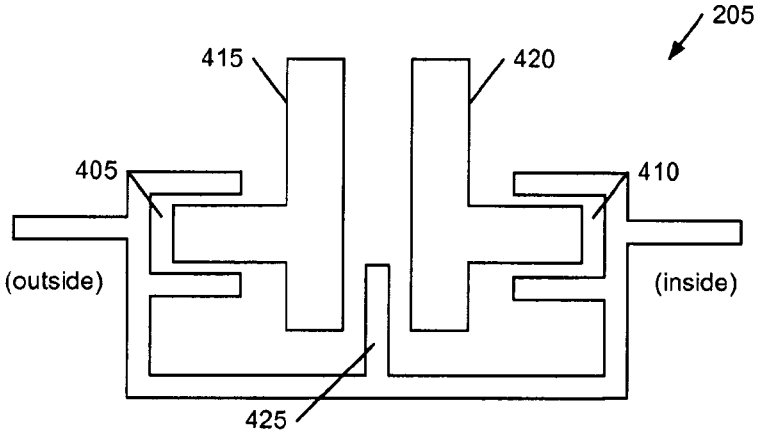
FIG. 4 illustrates a cross-sectional view of a sunroof track.

FIG. 4 illustrates a cross-sectional view of sunroof track 205 as looking from front-to-back of a left-hand-side track 205. Track 205 includes an outer continuous channel 405 and an inner continuous channel 410 rearward of a rear mechanism lifting/lowering cam. A representative outer channel engagement element 415 is duplicated in part of forward linkage 220 and in part of rearward linkage 225. A representative inner channel engagement element 420 is part of rearward linkage 225. A vertical guide rib 425 separates outer continuous channel 405 and inner continuous channel 410. Vertical guide rib 425 provides mechanical support and guidance for structures moving within the channels.

As discussed above, when sunroof 105 is opening, it must lift. This lifting is needed in order to provide clearance above region 215. In order for sunroof 105 to lift, it is actuated by lifting (or cam) elements to do so. These lifting elements are required to act upon both forward linkage 220 and rearward linkage 225. Forward linkage 220 is close to the front of sunroof 105 and when sunroof 105 is closed it is at the very forward end of track 205. Rearward linkage 225, when sunroof 105 is closed resides within track 205. In order to realize an unlimited opening potential, these embodiments provide channel 405 as one continuous guide channel in which both forward linkage 220 and rearward linkage 225 are guided inside. Channel 405 provides these linkages with appropriate mechanical support and guidance over the entire travel length of sunroof 105. These aspects are provided by the guide track design in combination with the design of rearward linkage 225 to initiate lifting when opening, and concluding lowering when closing, sunroof 105 with respect to opening 305.

Figure 5:
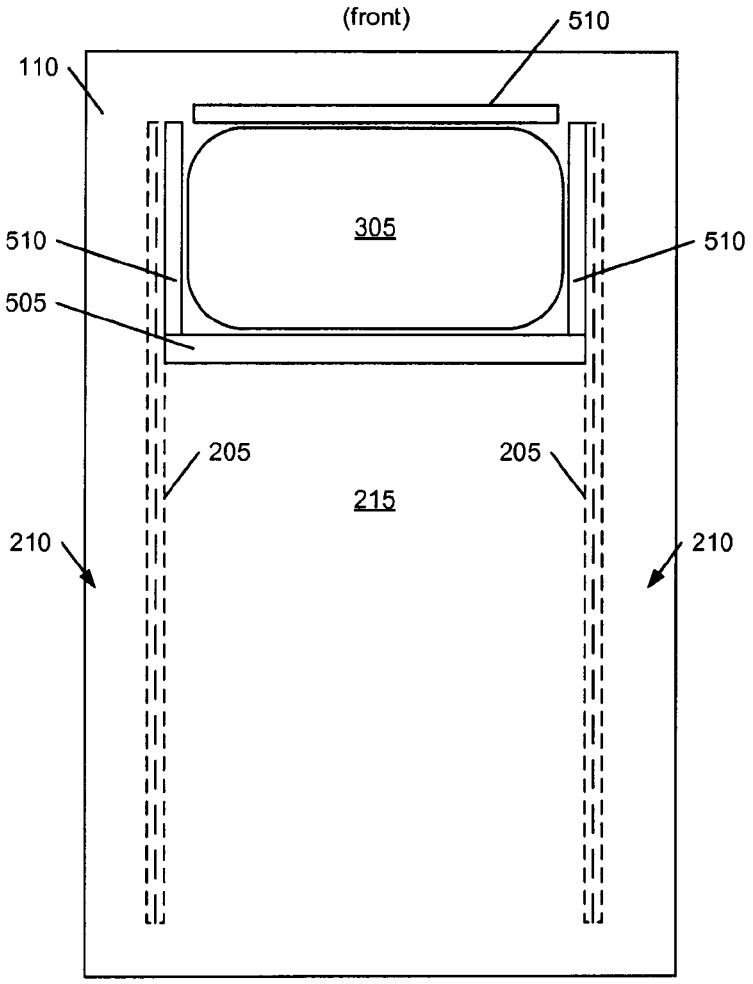
FIG. 5 illustrates the generic representation of FIG. 1 without top panels to reveal a structural cross-bow and sealing surfaces.

FIG. 5 illustrates the generic representation of FIG. 1 without sunroof 105 to reveal a structural cross bow 505 and a sealing surface 510. Cross bow 505 bridges a space of region 215 between tracks 205 without extending over either track 205. Cross bow 505 adds structural stability and strength, enhancing roof crush and side impact performance. Sealing surface 510 includes a compression seal cooperative with sunroof 105 when in the closed mode that provides environmental exclusion. While sealing surfaces are shown along lateral and edges, embodiments of the present invention may change, enhance, and/or remove some or all of the sealing surfaces to meet different performance and operational goals. Environmental components, such as wind noise and liquid elements (e.g., rain), are inhibited from entering opening 305 when sunroof 105 is closed and sealed. This arrangement of cross bow 505 and sealing surface 510 provides channel 405 and channel 410 of track 205 partly/entirely outside of the primary wind/water sealing system of roof portion 110. This, in turn, enables fore/aft travel of sunroof 105 to be limited only by vehicle architecture.

Various embodiments of the present invention have increased performance and operation of sunroof 105 by use of thinner, lighter weight materials than conventional sunroof materials. These materials include various plastics, polymers, and the like are not only thinner and lighter (and may be enhanced with ultraviolet shielding and other environmental protections, but because of the enablement of larger-sized openings, produce a larger-sized sunroof. In some cases, the larger size and the lighter/thinner material can introduce a design issue as sunroof 105 may negatively impact vehicle noise, vibration, and harshness (NVH). Embodiments of the present invention may include a latching system incorporated into sunroof 105 and cross bow 505 (e.g., a "hook" on a rearward edge of sunroof 105 for selective engagement with/disengagement from a complementary "latch" on a midpoint location of cross bow 505). The latching system helps to reduce NVH factors by securing the trailing edge of sunroof 105 and enhancing any environmental sealing as well. The latching/unlatching is preferably automatic with closing/opening, respectively, sunroof 105.

Preferably a mechanical/electromechanical system is coupled to the linkage mechanisms in order to move them. Movement of the linkage mechanisms operates sunroof 105 to move it between the closed mode and the opened mode. The mechanical/electromechanical system may be motorized or manually operated.

Figure 6:
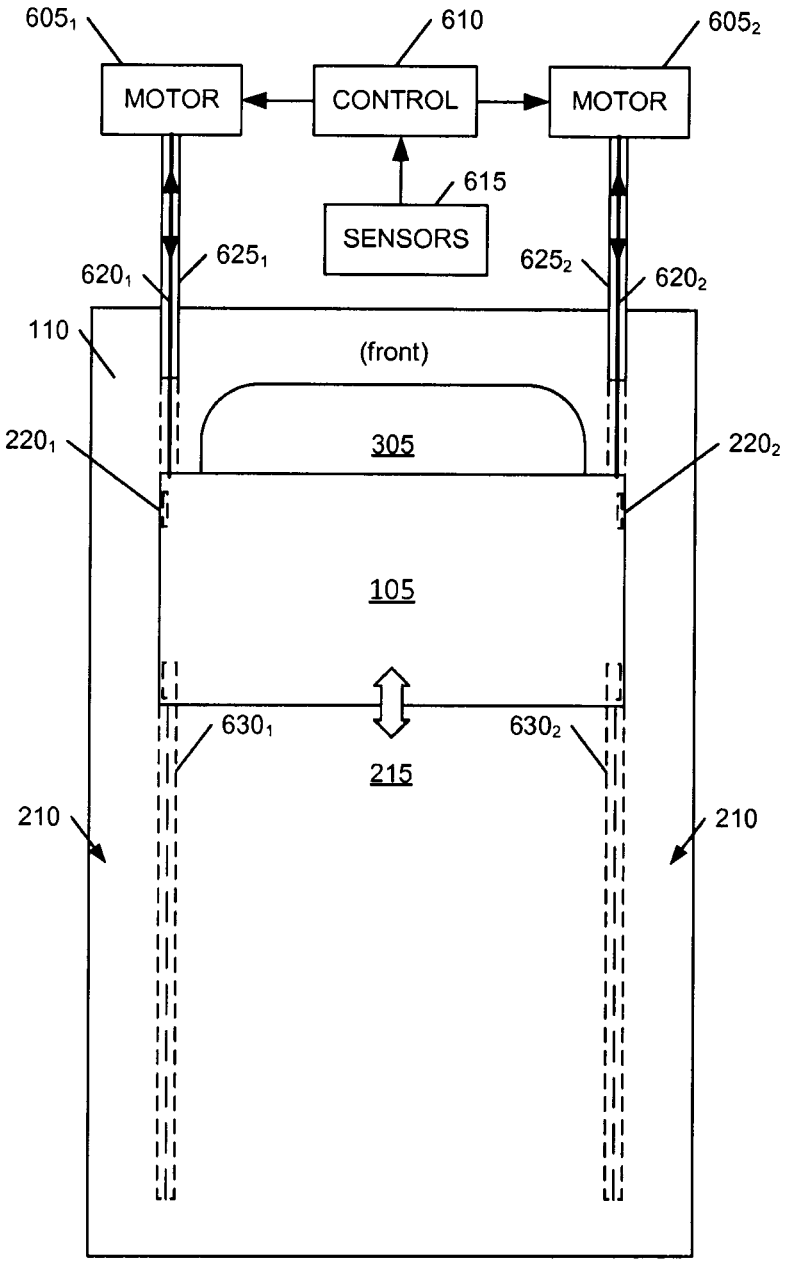
FIG. 6 illustrates a schematic block diagram of a kinematic system for controlling motion of the sunroof.

FIG. 6 illustrates a schematic block diagram of a kinematic system 600 for controlling motion of sunroof 105. System 600 includes a pair of sunroof motors 605 (e.g., a left-hand motor $\mathbf{605}_1$ and a right hand motor $\mathbf{605}_2$) and a motor controller 610 coupled to each motor 605. Motors 605 are remotely-located relative to a roof line of the passenger compartment, with each motor 605 independently responsive to one or more control signals from controller 610. For purposes of this application, the roof line of a passenger compartment in a vehicle is defined by a plane passing through the upper ends of the pillars of the passenger compartment. Controller 610 generates the one or more control signals responsive to input from a sensor system 615. In some embodiments, motors 605 include encoders/encoder sensors and may in some instances be considered a hybrid motor, control, and sensor assembly combining two or more these elements. Sensor feedback from one or both motors 605 can be used by controller 610 to refine/control the separate motors (for example using RPM matching).

There are many different possible control systems that may be used. For example, controller may issue continuous "run" control signals which cause motor 605 to wind/unwind until controller 610 stops issuing the commands. In other systems, controller 610 may issue separate start and stop commands with motor 605 running until receiving a countervailing command. In still other systems, controller 610 issues a control signal with a particular position and motor 605 includes an encoder or other intelligence to move sunroof 105 to the commanded location. Sensor system 615 provides distributed sensors to measure opening, closing, motor speed, hand interference in opening 305 (e.g., anti-pinch in case of obstruction), and other desired operational and performance metrics.

Each motor 605 is coupled to a forward linkage 220 by a flexible cable 620 running through a conduit 625. Cable 620 is sufficiently flexible to be wound around a reel or the like without undesirable amounts of plastic deformation due to loading (tension or compression) during movement of sunroof 105. Conduit 625 enables extension of cable 620 (e.g., when motor 605 unwinds cable 620 from a reel) to control a fore/aft location of its corresponding side of sunroof 105 without bending or buckling. When cable 620 exits conduit 625 for attachment to forward linkage 220, it enters into a conduit channel in a continuous track 630. Track 630 is an embodiment of track 205 that includes the conduit channel through which cable 620 operates. The conduit channel provides similar functionality as conduit 625 for that portion of cable 620 outside of conduit 625. In some implementations, an alternative mechanical coupling to cable 620 may provide the necessary mechanical interface of motor 605 to sunroof 105 (e.g., a mechanical worm drive or gear assembly or other actuating assembly).

Figure 7:
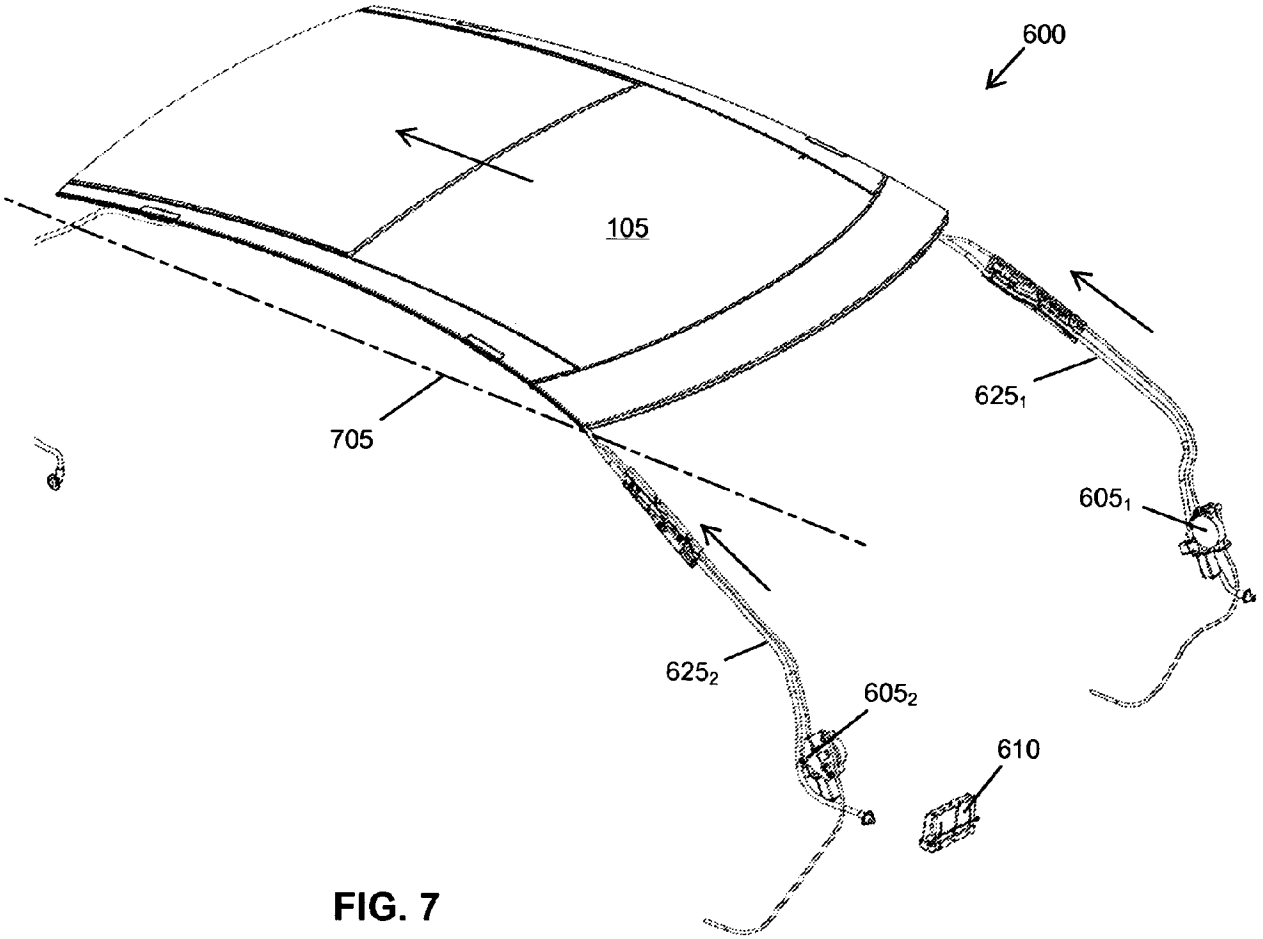
FIG. 7 illustrates a side perspective view of the kinematic system of FIG. 6.

FIG. 7 illustrates a side perspective view of kinematic system 600 of FIG. 6 installed into a passenger vehicle. Motors 605 are installed remotely from sunroof 105, one motor per side of the vehicle. Motors 605 are mounted to the body structure of the vehicle below a roof line 705, such as in a forward portion of the passenger compartment (e.g. behind the dash area below an area where a pillar A terminates, in a storage "trunk" area where a rearmost pillar terminates (e.g., pillar C), or the like). There are several pillars in a vehicle, with these pillars being vertical/near vertical structures supporting the roof. Pillars are designated by letters of the alphabet, starting at the front with "A."

In this case, the conduits are installed at the pillars (i.e., conduit $\mathbf{625}_1$ installed at a left-hand side pillar A and conduit $\mathbf{625}_2$ installed at a right-hand side pillar B). It is not required, but it is advantageous for operational and manufacturing reasons, to locate the motors and the conduits near forward-most or rearmost pillars.

In operation, each motor 605 moves its respective side of sunroof 105 independent of (or fully/partially dependent upon) the other motor 605 from a location remote from, and below, the roof line. Controller 610 issues open control signals to both motors 605, each motor in response unwinds its associated cable 620. Unwinding cable 620 moves sunroof 105 rearward by driving forward linkages 220 rearward along track 630. Sensor system 615 may be used to inform motor 605/controller 610 (depending upon implementation) when to stop unwinding cable 620. Controller 610 issues close control signals to both motors 605, each motor in response winds its associated cable 620. Winding cable 620 moves sunroof 105 forward by pulling forward linkages 220 forward along track 630. Sensor system 615 may be used to inform motor 605/controller 610 (depending upon implementation) when to stop winding cable 620.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A moveable panel system for a roof of a passenger compartment of a vehicle, comprising:

a roof wall of the vehicle, a left lateral edge, a right lateral edge, a front edge, and a rear edge with said roof wall defining a passenger compartment opening between said edges;

a pair of tracks disposed in said roof wall and longitudinally extending from said front edge towards said rear edge including a left track extending along said left lateral edge and a right track extending along said right lateral edge;

a panel sized to close said opening;

a set of mechanical linkages disposed in said tracks and moveably coupling said panel to said tracks, said set of mechanical linkages including a left mechanical linkage coupled to a left side of said panel and a right mechanical linkage coupled to a right side of said panel;

a left mechanical interface coupled to said left mechanical linkage having an open mode that moves said left side towards said rear edge and said left mechanical interface having a close mode that moves said left side towards said front edge;

a right mechanical interface, independent from said left mechanical interface, coupled to said right mechanical linkage having an open mode that moves said right side towards said rear edge and said right mechanical interface having a close mode that moves said right side towards said front edge;

a pair of motors mounted to the vehicle and responsive to a plurality of motor control signals, said pair of motors including a left motor coupled to said left mechanical interface and controlling said modes of said left mechanical interface and including a right motor coupled to said right mechanical interface and controlling said modes of said right mechanical interface, wherein said left mechanical interface includes a left conduit extending from said left motor to said left track and a left flexible cable extending from a reel of said left motor to said left mechanical linkage through said left conduit; wherein said right mechanical interface includes a right conduit extending from said right motor to said right track and a right flexible cable extending from a reel of said right motor to said right mechanical linkage through said right conduit; and wherein said modes of said mechanical linkages are controlled by winding/unwinding said cables; and a motor controller coupled to said motors and generating said plurality of motor control signals including an open control signal and a closed control signal with said open control signal causing said motors to operate their coupled mechanical interfaces in said open mode and with said close control signal causing said motors to operate their coupled mechanical interfaces in said close mode.

2. The moveable panel system of claim 1 wherein said motors are disposed forward of said panel wherein said open mode for said mechanical interfaces includes extending said cables by unwinding said cables from said reels; and wherein said close mode for said mechanical interfaces includes retracting said cables by winding said cables on said reels.

3. The moveable panel system of claim 1 wherein said motors are disposed rearward of said panel wherein said open mode for said mechanical interfaces includes retracting said cables by winding said cables on said reels; and wherein said close mode for said mechanical interfaces includes extending said cables by unwinding said cables from said reels.

4. A system for operating a moveable panel with respect to an opening in a roof of a passenger vehicle and responsive to a motor controller generating a plurality of motor control signals, comprising:

a panel guide assembly coupled to the roof, said panel guide assembly including a pair of track at lateral edges of the roof;

a set of mechanical linkages moveably coupling the moveable panel to said tracks, said set of mechanical linkages including a first mechanical linkage coupled to a first side of the moveable panel and a second mechanical linkage coupled to a second side of the moveable panel;

a pair of mechanical interfaces coupled to said linkages, a first mechanical interface moving said first mechanical linkage and a second mechanical interface moving said second mechanical linkage; and a pair of motors mounted to the passenger vehicle and responsive to the plurality of motor control signals, said pair of motors including a first motor coupled to said first mechanical interface and including a second motor coupled to said second mechanical interface, wherein each said mechanical interface includes a conduit extending from a respective motor to said respective track and a flexible cable extending from a reel of said respective motor to said respective mechanical linkage through said respective conduit; and wherein said mechanical linkages include an open mode and a closed mode controlled by winding/unwinding said flexible cables onto/from said reels.

5. The moveable panel system of claim 4 wherein said motors are disposed forward of said panel wherein said open mode for said mechanical interfaces includes extending said cables by unwinding said cables from said reels; and wherein said close mode for said mechanical interfaces includes retracting said cables by winding said cables on said reels.

6. The moveable panel system of claim 4 wherein said motors are disposed rearward of said panel wherein said open mode for said mechanical interfaces includes retracting said cables by winding said cables on said reels; and wherein said close mode for said mechanical interfaces includes extending said cables by unwinding said cables from said reels.

7. A method for operating a sunroof of a passenger vehicle, the sunroof moveably coupled to a pair of lateral tracks disposed in a roof of the passenger vehicle, comprising: operating a first mechanical interface coupled to a first lateral edge of the sunroof using a first remote motor; and operating a second mechanical interface, concurrently with operation of said first mechanical interface, coupled to a second lateral edge of the sunroof using a second remote motor; wherein operation of said mechanical interfaces opens and closes the sunroof, wherein each said mechanical interface includes a conduit extending from a respective motor to said respective track and a flexible cable extending from a reel of said respective motor to a respective mechanical linkage through said respective conduit; and wherein said mechanical linkages include an open mode and a closed mode controlled by winding/unwinding said flexible cables onto/from said reels.

* * * * *